UNITED STATES PATENT OFFICE.

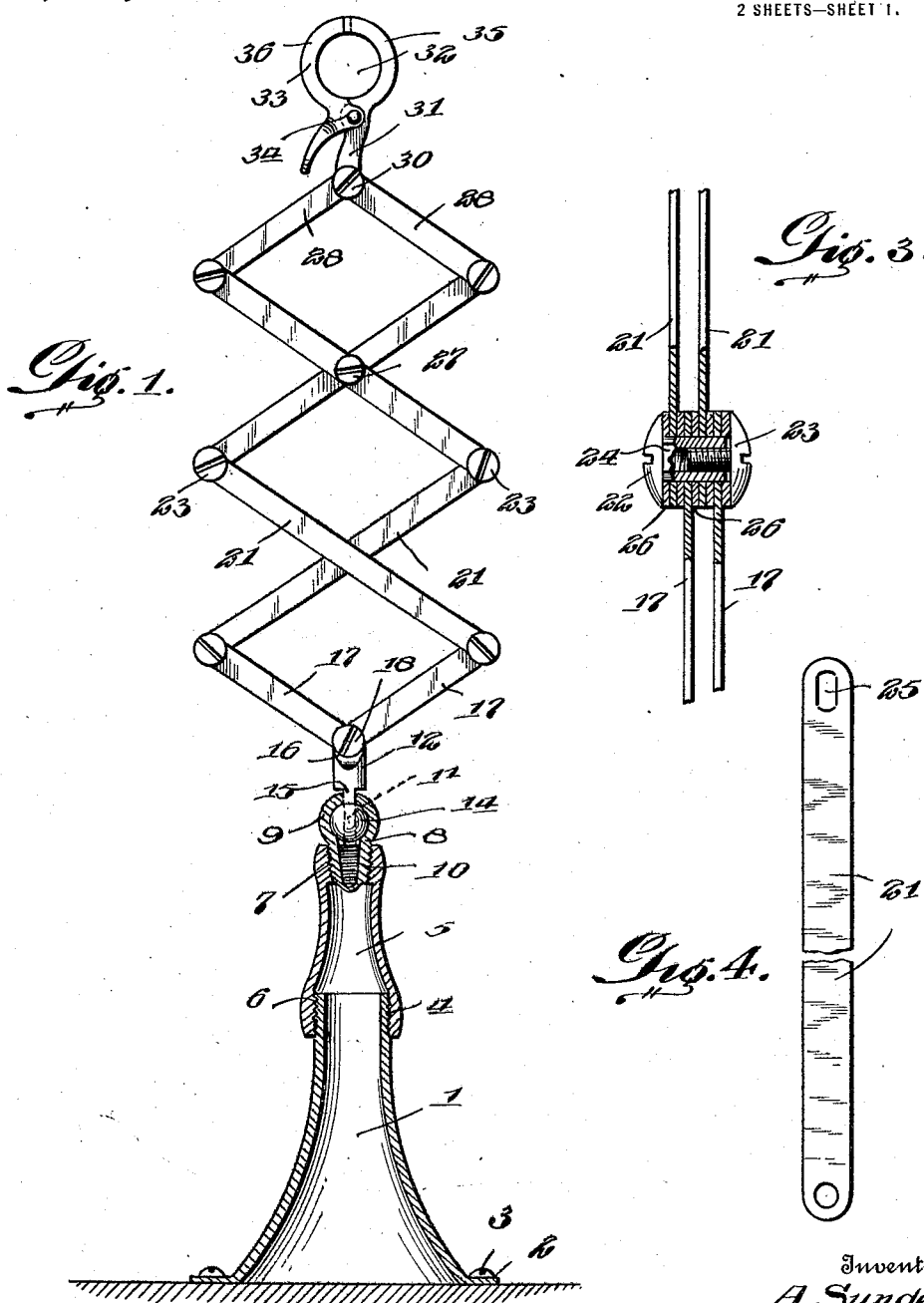

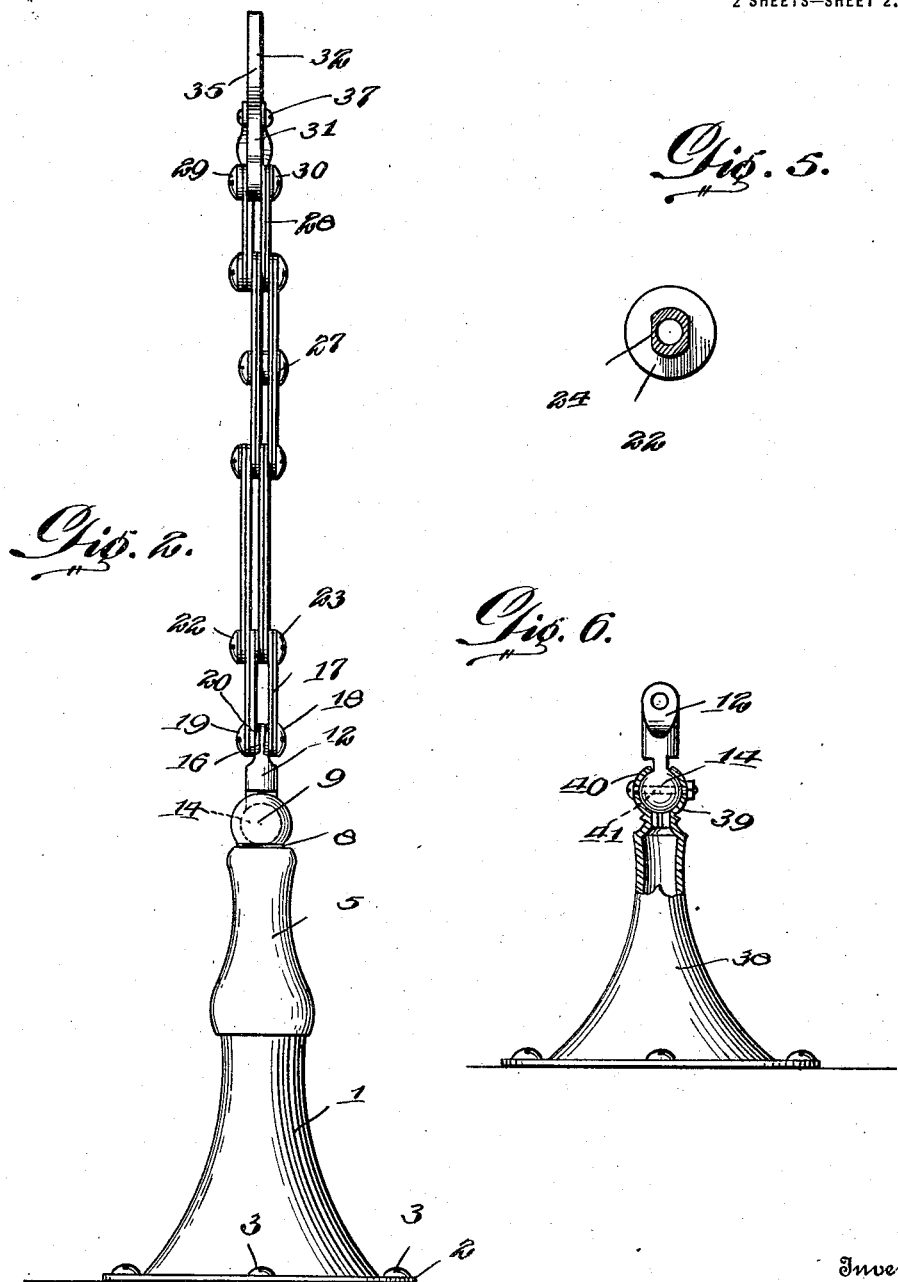

ALEXIUS SUNDEN, OF COQUILLE, OREGON.

LAMP-SUPPORT.

1,277,270.  Specification of Letters Patent.  Patented Aug. 27, 1918.

Application filed August 25, 1916.  Serial No. 116,897.

*To all whom it may concern:*

Be it known that I, ALEXIUS SUNDEN, who have declared my intention to become a citizen of the United States, residing at Coquille, in the county of Coos and State of Oregon, have invented new and useful Improvements in Lamp-Supports, of which the following is a specification.

This invention is an improved supporting stand for electric lamps and for candles and the like, the object of the invention being to provide an improved supporting stand of this kind by means of which the electric lamp, candle or other object carried by the supporting stand may be adjusted in any desired direction and raised or lowered as required.

The invention consists in the features of construction, combination, and arrangement of devices, hereinafter fully described and claimed.

In the accompanying drawings:

Figure 1 is a vertical sectional view of a stand or support constructed and arranged in accordance with my invention.

Fig. 2 is an elevation of the same at right angles to Fig. 1.

Fig. 3 is a detail sectional view of the same.

Figs. 4 and 5 are detail elevations of the same.

Fig. 6 is an elevation of a modified form of the invention.

In the embodiment of the invention, I provide a base 1 which is hollow and substantially conical and is provided at its lower side with an outstanding flange 2 having openings for the reception of screws 3 or other suitable devices wherewith to secure the base on a desk, table, or other article of furniture or to a wall or other support as the case may be. The base is provided at its upper or outer end with an exteriorly threaded portion 4. A member 5 is detachably secured to the upper end of the base, is hollow, and is provided at its lower end with internal threads 6 for engagement by the threads 4 and is further provided at its upper end with internal threads 7. The member 5 forms a handle by which the stand or support may be grasped and moved from place to place when the base is not secured on a disk or other supporting object.

A member 8 is provided with a substantially globular socket 9 and also with a tubular portion 10, said tubular portion being exteriorly threaded and adapted to be screwed in the upper end of the handle or coupling member 5. The socket 9 has a segmental socket 11 in its upper side extending transversely thereon.

The member 8 coacts with a member 12 to adjustably and detachably connect a lazy tongs 13 to the handle portion 5 of the base. Said member 12 has a ball 14 which is revoluby fitted in the socket 9 and also has a neck 15 which extends through and is movable in the slot 11. The upper end of the member 12 is flattened on opposite sides as at 16 and link members 17 have their lower ends pivotally connected to said member 12 by a pair of screws 18, 19, the screw 18 extending through openings in one of the links and in the reduced portion of the member 12, and the screw 19 extending through an opening in the other link and having threaded engagement with the screw 18. Washers 20 are arranged on said screws and bear between the heads thereof and the links, as shown. In practice suitable means are provided to prevent the screws 18, 19 from working loose. A series of links 21 are pivotally connected together at their ends and are also pivotally connected to the links 17 by screws 22, 23, which pass through openings in said links. Each screw 22 has a portion 24, flattened on opposite sides and passed through an oblong slot 25 in one of the links 21, so that the screws 22 are prevented from turning. Each screw 23 engages a threaded opening in one of the screws 22. Washers 26 are placed on the screws 22, 23, and bear between the heads thereof and the links as will be understood. In practice suitable means are provided to lock the screws 23 and prevent the same from working loose. It will be observed that the links are doubled or arranged in pairs, so that the lazy tongs is strengthened and is prevented from wabbling laterally. The links 21 are pivotally connected together at one point by a pair of centrally arranged screws 27 which are similar to the screws 22, 23. The pair of links 28, at the upper end of the lazy tongs arm or member of the stand, are pivotally connected together by a pair of screws 29, 30, similar to the screws 22, 23, said screws 29, 30 also pivotally connecting one member 31 of a clamp or holder 32 to the free or upper end of the lazy tongs member. Said clamp or holder comprises a member 33 which is pivotally connected to the member 31 as at 34, said members having oppositely curved jaws 35, 36 respectively, adapted to clamp the socket of an electric lamp or to clamp a candle or other object between them and hence an electric lamp, a candle, or other desired or suitable object may be carried by the stand or support as will be understood.

The lazy tongs member enables the electric lamp or candle to be adjusted vertically to any desired height and by turning the lazy tongs member in one direction or the other, parallel with its links, the lamp or other article carried by the stand may be extended from either side of the stand. The member 12, may be turned in the member 8 in a plane at right angles to the plane of the links of the lazy tongs member, to enable the lazy tongs member to be adjusted correspondingly and hence said member may be adjusted in either of two directions at right angles to each other as will be understood.

In Fig. 6 I show a modified form of my invention in which the base 38 is formed drectly with a socket portion 39 for the reception of the ball 14 of the holder coupling and adjusting member 12, said ball 14 being pivotally connected between the sides 40 by means of a split pin 41.

In practice the various parts of my improved supporting and adjusting stand may be made of sheet metal or of any other suitable material.

From the foregoing description, taken in connection with the accompanying drawings, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the claim appended hereto.

Having described the invention, what is claimed is:

In a device of the class described, a base, a handle member detachably connected to the base, a socket member detachably connected to the handle member, a member having a ball fitted in the socket member, the last-named member being angularly movable with respect to the socket member, a lazy tongs arm connected to the last-named member, and a holder member carried by the lazy tongs arm.

In testimony whereof I affix my signature.

ALEXIUS SUNDEN.

Copies of this patent may be obtained for five cents each, by addressing the "Commissioner of Patents, Washington, D. C."